April 5, 1938.  C. ROEHRI  2,113,410
PLASTIC METAL MOLDING MACHINE
Filed Jan. 14, 1937  2 Sheets-Sheet 1

Inventor:
Carl Roehri
By: Zabel Farlow & Wells
Attys.

April 5, 1938.    C. ROEHRI    2,113,410
PLASTIC METAL MOLDING MACHINE
Filed Jan. 14, 1937    2 Sheets-Sheet 2
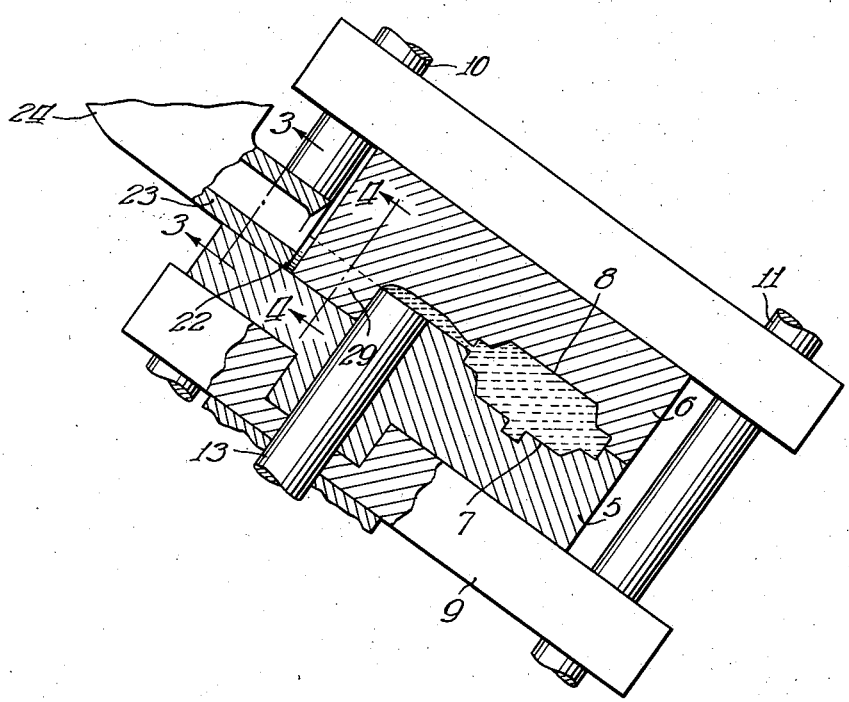
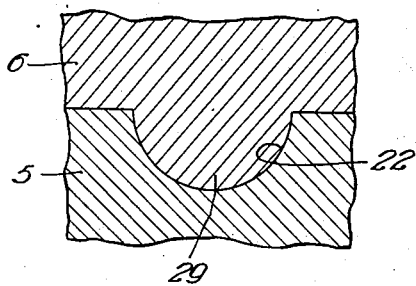
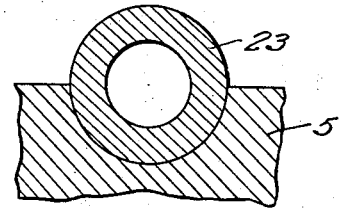

Patented Apr. 5, 1938

2,113,410

UNITED STATES PATENT OFFICE 2,113,410

PLASTIC METAL MOLDING MACHINE

Carl Roehri, Chicago, Ill.

Application January 14, 1937, Serial No. 120,528

4 Claims. (Cl. 22—68)

The present invention relates to machines for making die castings or moldings and more particularly to that type of machine for casting articles by the high pressure method, that is by forcing the material in a plastic state into the mold cavity under a high pressure.

It is a purpose of the present invention to provide a machine of this character with a novel arrangement for measuring and storing the plastic material preparatory to closing the dies and forcing the material under pressure into the mold cavity.

My invention further contemplates the provision in a machine of this character of a novel method of closing the metal receiving well in which the material to be cast is measured and held prior to forcing it into the mold cavity.

More particularly my invention comprises the provision of a novel die structure of this character wherein the stationary die is so arranged as to carry both a mold cavity cooperating with the movable die and a well in which the supply of material to be forced into the mold cavity is held while the dies are closing. The dies may be provided with any suitable means for causing one of them to move relative to the other, and any known means may be provided for measuring out the supply of metal to be placed in the pressure well.

The features of the present invention are not limited to the means for operating the several parts, but reside in the novel structural features as will hereinafter more fully appear.

In the drawings—

Fig. 2 is a fragmentary sectional view similar to Fig. 1 showing the dies closed;

Fig. 3 is a sectional view on the line 3—3 of Fig. 2; and

Fig. 4 is a sectional view on the line 4—4 of Fig. 2.

Figure 1:
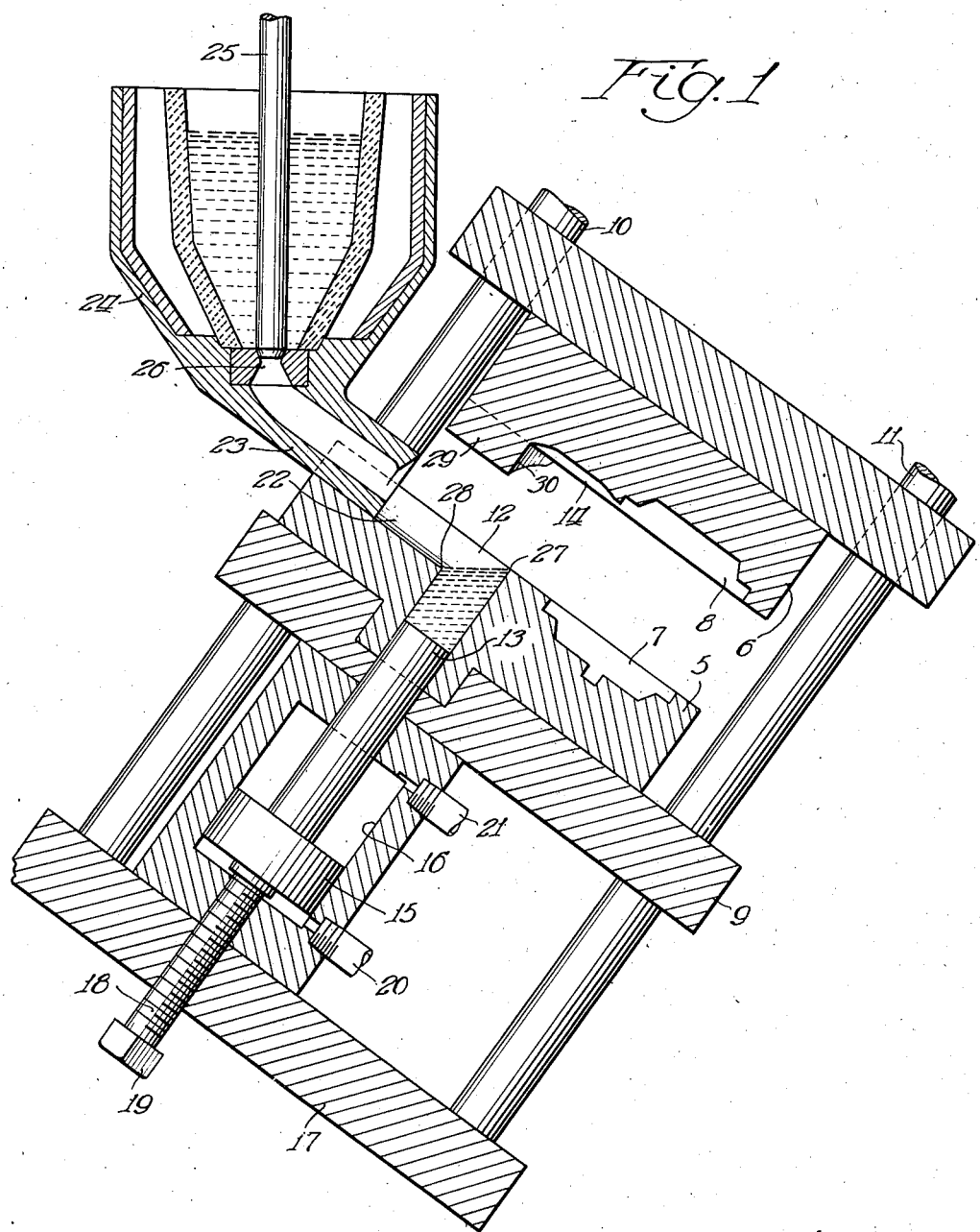
Fig. 1 is a vertical sectional view through a portion of the die casting machine embodying the invention.

Referring now in detail to the drawings, the present invention is embodied in a casting machine wherein a pair of dies 5 and 6 are arranged so as to be movable with respect to each other, each die having a mold cavity therein such as the mold cavity 7 in the die 5 and the mold cavity 8 in the die 6. The die 5 is a stationary die and is supported upon a bed plate 9 so that the upper surface of the die is tilted at an angle of approximately 30 degrees to the horizontal. The upper die 6 is the movable die and is guided by a plurality of rods such as 10 and 11 in its movement toward and away from the die 5. The particular mechanism by which the dies are operated is of no consequence in the present invention.

The lower die 5 has therein a cylindrical well 12 in which a piston 13 is movable in order that plastic material in the well 12 may be forced out at the upper end thereof. The upper die 6 has a recess 14 in the lower face thereof through which the plastic material may pass from the well 12 into the mold cavity formed by recesses 7 and 8 when the dies are closed as shown in Fig. 2. The piston 13 is operated by a larger piston 15 thereon which works in a cylinder 16. The cylinder 16 is supported upon a lower frame member 17 in which an adjustable stop member 18 is screw threaded. The stop member 18 extends into the cylinder 16 and may be adjusted up and down by means of a square head 19 thereon to limit the down stroke of the piston 15 and therefore the degree of opening of the well 12. In this way, the capacity of the well 12 may be set for any desired amount. Suitable conduits 20 and 21 may be utilized for applying hydraulic pressure on the opposite sides of the piston 15 as will be readily understood.

For filling the well 12, the die 5 is provided with a semi-cylindrical trough 22 which receives a pouring spout 23 leading from a container 24 for the plastic material. This container may be of any suitable kind and is provided with a valve 25 for controlling the flow of plastic material through an outlet 26 into the pouring spout 23. The trough 22 is preferably of such a depth that, when the material in the well 12 reaches the level of the lowest point of its contact with the surface of the die 5 at 27, the level of the material will also be just at the meeting point between the trough 22 and the well 12 at 28.

The upper die is provided with means for closing the trough 22 and sealing the well 12 off from the pouring spout 23. This means comprises a semi-cylindrical projection 29 shaped to fit the trough 22 and adapted to seat in the trough when the upper die is moved down to closed position. The inner face 30 of the projection 29 is shaped to fit the contour of the well 12 so that the piston 13 in its upper movement to empty the well 12 passes over the die face 30 as a continuation of the wall of the well 12.

The construction of the device, it is believed, will be readily apparent from the foregoing description. A brief résumé will now be given of the operation assuming that the dies are emptied and in open position as shown in Fig. 1.

The valve 25 is opened, and a measured charge of plastic material is allowed to fill the well 12. The amount of material inserted may well be predetermined at the time of opening the valve 25 so as to just fill the well 12 as shown in Fig. 1. After this has happened, the next step is to move the die 6 down into closed position or, in other words, in the position shown in Fig. 2 while the piston 13 remains in the retracted position. After the dies have closed and the projection 29 is seated in the trough 22 so as to seal the well 12, the piston 15 is then moved upward by applying pressure beneath it so as to cause the piston 13 to force the plastic material upwardly from the well 12 through the passageway formed by the recess 14 and into the mold cavity formed by recesses 7 and 8. After the pressure stroke has taken place and the material has set in the dies 7 and 8, sufficient pressure is applied to the top side of the piston 15 so as to withdraw the piston 13 after which the dies are opened and the cast object is removed.

From the above description, it is believed that the construction and advantages of this device will be readily apparent to those skilled in this art.

Having thus described one specific form of my invention, what I claim as new and desire to secure by Letters Patent is:

1. A device of the character described having a pair of dies, one of which is movable with respect to the other, said dies having cooperating depressions on their faces adapted to provide a cavity when the dies are against each other to receive a plastic material, one of said dies having a well therein terminating at the face with which the other die contacts, a piston operating in said well, means for supplying plastic or liquid material to be cast to said well, said means comprising a trough in one of the dies, and means on the other die for closing said trough when the dies are pressed together.

2. A device of the character described comprising a lower die having its upper face provided with a mold cavity, means supporting said die with its upper face tilted to the horizontal, a well in said die above the mold cavity adapted to receive the material to be cast, a piston in said well operable to force the material in said well upwardly to cause it to flow down into the mold cavity, an upper die cooperating with said lower die to seal the mold cavity, and means to fill said well with the material to be cast, said means comprising a trough leading to said well, and means on the upper die for closing said trough.

3. A device of the character described comprising a lower die having its upper face provided with a mold cavity, means supporting said die with its upper face tilted to the horizontal, a well in said die opening upon said upper face at one side of the mold cavity and adapted to receive the material to be cast, an upper die cooperating with the lower die to seal the mold cavity, one of said dies being recessed between the mold cavity and the well, means to force the material in said well upwardly to the upper face of said lower die to cause it to flow through said recess into the mold cavity, a passage in the lower die for filling said well with material to be cast, and means on the upper die for closing said passage.

4. A device of the character described comprising a lower die having its upper face provided with a mold cavity, a well in said die opening upon the upper face thereof at one side of said cavity, an upper die cooperating with the lower die to seal the mold cavity, said upper die having a recess connecting the well opening and the mold cavity when the dies are closed, and means to empty the well through said recess into the mold cavity, said lower die having a filling trough in its upper surface leading to said well, and said upper die having a projection thereon closing said trough when the dies are closed.

CARL ROEHRI.